US010448024B2

(12) United States Patent
Thirumalai et al.

(10) Patent No.: US 10,448,024 B2
(45) Date of Patent: Oct. 15, 2019

(54) SYSTEM AND METHODS FOR CALCULATING DISTORTION IN DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 15/398,567

(22) Filed: Jan. 4, 2017

(65) Prior Publication Data
US 2017/0201753 A1    Jul. 13, 2017

Related U.S. Application Data

(60) Provisional application No. 62/277,379, filed on Jan. 11, 2016.

(51) Int. Cl.
| | |
|---|---|
| *H04N 19/154* | (2014.01) |
| *H04N 19/174* | (2014.01) |
| *H04N 19/186* | (2014.01) |
| *H04N 19/103* | (2014.01) |
| *H04N 19/60* | (2014.01) |
| *H04N 19/176* | (2014.01) |
| *H04N 19/147* | (2014.01) |
| *H04N 19/117* | (2014.01) |

(Continued)

(52) U.S. Cl.
CPC ......... *H04N 19/154* (2014.11); *H04N 19/103* (2014.11); *H04N 19/117* (2014.11); *H04N 19/12* (2014.11); *H04N 19/147* (2014.11); *H04N 19/174* (2014.11); *H04N 19/176* (2014.11); *H04N 19/186* (2014.11); *H04N 19/60* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 7,317,759 B1 | 1/2008 | Turaga et al. | |
| 9,609,343 B1 * | 3/2017 | Chen | H04N 19/107 |

(Continued)

FOREIGN PATENT DOCUMENTS

WO    WO-2014066488 A1 *   5/2014   ........... H04N 19/147

OTHER PUBLICATIONS

Walls et al., "VESA Display Stream Compression: An Overview" Jul. 7, 2014, SID Symposium Digest of Technical Papers, 45: 360-363 (Year: 2014).*

(Continued)

*Primary Examiner* — James M Anderson, II
(74) *Attorney, Agent, or Firm* — Shumaker & Sieffert, P.A.

(57) ABSTRACT

Systems and methods are disclosed for calculating a distortion value of a frame or block, in a number of color spaces, and determining an optimal coding mode based on the calculated distortion values. One embodiment includes a system having a video source that includes a video camera or a video archive that contains previously stored video content, and a processor configured to encode the stored video content.

20 Claims, 7 Drawing Sheets

(51) Int. Cl.
*H04N 19/12* (2014.01)
*H04N 19/85* (2014.01)

(56) References Cited

U.S. PATENT DOCUMENTS

| | | | | |
|---|---|---|---|---|
| 2014/0193094 A1* | 7/2014 | Shin | ............... | G06T 5/002 |
| | | | | 382/264 |
| 2014/0376611 A1* | 12/2014 | Kim | ............ | H04N 19/176 |
| | | | | 375/240.02 |
| 2015/0304675 A1 | 10/2015 | Jacobson et al. | | |
| 2017/0105012 A1* | 4/2017 | Wu | ............ | H04N 19/176 |

OTHER PUBLICATIONS

Anonymous: "Brute-force search—Wikipedia", Aug. 4, 2008 (Aug. 4, 2008), XP055417973, Retrieved from the Internet: URL: https://en.wikipedia.org/w/index.php?title=Brute-force_search&oldid=229803804 [retrieved on Oct. 23, 2017]; 5 Pages.
International Search Report and Written Opinion—PCT/US2017/012331—ISA/EPO—dated Mar. 29, 2017.

\* cited by examiner

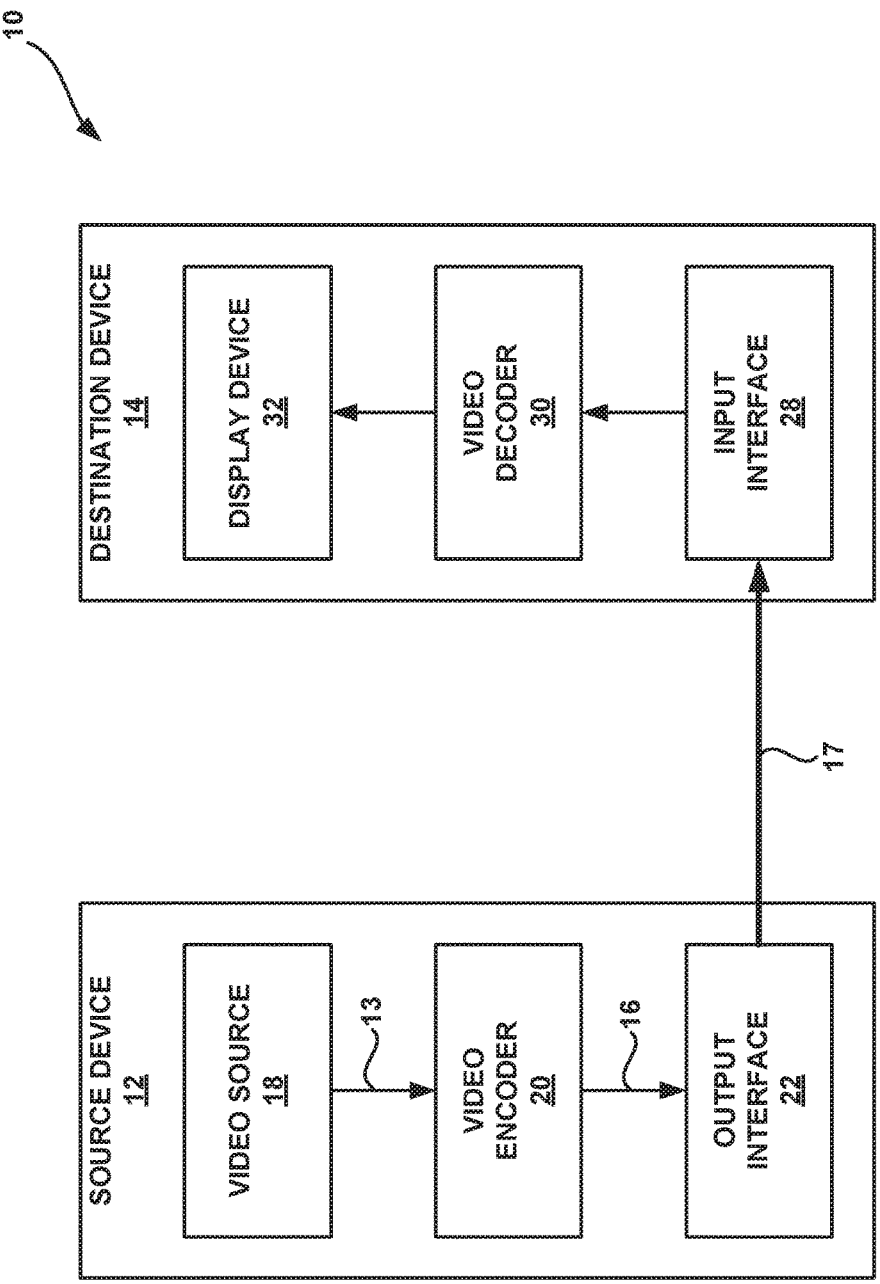

SYSTEM AND METHODS FOR CALCULATING DISTORTION IN DISPLAY STREAM COMPRESSION (DSC)

CROSS REFERENCE TO RELATED APPLICATION(S)

This application claims the benefit of priority under 35 U.S.C. § 119(e) of U.S. Provisional Patent Application No. 62/277,379 filed on Jan. 11, 2016, the entire contents of which are hereby incorporated by reference in their entirety herein and should be considered a part of this application.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

One innovation includes an apparatus for coding video data. The apparatus may include a memory for storing the video data and information about a plurality of coding modes, the video data comprising a plurality of video blocks. The apparatus may also include a hardware processor operationally coupled to the memory. The processor may be configured to select one of a plurality of color spaces for a video block of the plurality of video blocks, apply a color transformation to every video block of the plurality of video blocks that is not in the selected color space and verify that all of the video blocks of the plurality of video blocks are in the selected color space, and determine a distortion value of each of the plurality of video blocks based on the selected color space.

For some embodiments, the apparatus may be configured to determine an initial color space of each video block of the plurality of video blocks, the initial color space being the color space of each video block prior to application of the color transformation, determine which coding modes of the plurality of coding modes are compatible with the initial color space; and encode the video block of the plurality of video blocks with the compatible coding modes to provide an encoded block.

For some embodiments, the apparatus may be configured to determine which coding modes of the plurality of coding modes are not compatible with an initial color space, the initial color space being the color space of each video block prior to application of the color transformation, apply the color transformation to the initial color space to provide a compatible color block, and encode the compatible color block with the coding modes not compatible with the initial color space to provide an encoded block.

In some embodiments, the apparatus may be configured to calculate a residue block from the video block and the encoded block, the residue block indicative of a difference between the video block and the encoded block.

In some embodiments, determining the distortion value comprises determining the distortion value of the residue block.

In some embodiments, the selected color space comprises a luma-chroma color space and wherein determining the distortion value comprises normalizing each chroma component of the luma-chroma color space.

In some embodiments, the video block comprises a number of color planes, and wherein determining the distortion value of the video block comprises at least one of a sum of absolute differences of each color plane of the number of color planes, and a sum of square error of each color plane of the number of color planes.

In some embodiments, the color transformation is based on a transformation matrix, the transformation matrix is defined by a number of columns indicative of a number of color planes of the selected color space, and wherein the hardware processor is further configured to determine a weight value based on a Euclidean norm of a column of the number of columns.

In some embodiments, the distortion value of the transformed video block is based on at least one of a sum of absolute differences of each color plane of the number of color planes, wherein each color plane is multiplied by a corresponding weight value of the number of weight values, and a sum of square error of each color plane of the number of color planes, wherein each color plane is multiplied by the corresponding weight of the number of weights.

In some embodiments, the selected color space is in at least one of a luma-chroma color space and an RGB color space.

In some embodiments, determining a distortion value further comprises determining a coding mode of the plurality of coding modes based on (i) the distortion value of each of the plurality of video blocks, (ii) a lambda value, and (iii) a bitstream rate for communicating the video block.

In some embodiments, each video block of the plurality of video blocks is indicative of a single video block that has been encoded using every coding mode of the plurality of coding modes.

BRIEF DESCRIPTION OF THE DRAWINGS

FIG. 1A is a block diagram illustrating an example video encoding and decoding system that may utilize techniques in accordance with aspects described in this disclosure.

DETAILED DESCRIPTION

Figure 1B:
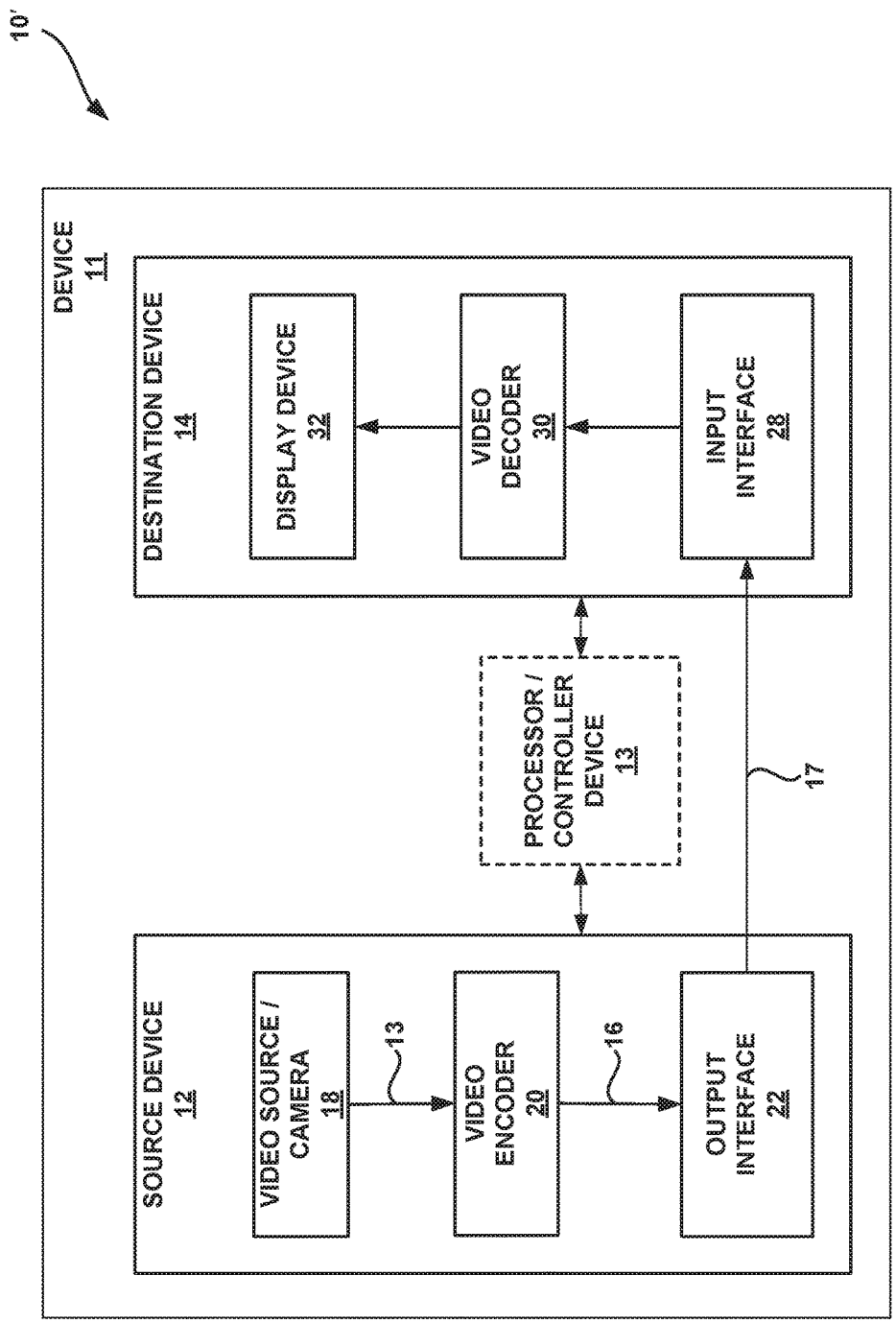
FIG. 1B is a block diagram illustrating another example video encoding and decoding system that may perform techniques in accordance with aspects described in this disclosure.

Disclosed herein is a DSC coder that provides fixed rate and visually lossless compression. The coder is designed on a block or slice-based approach (e.g., with block size being P×Q) and may be implemented with one or more of a multitude of coding modes. For example, available coding options for each block include transform mode (e.g., DCT, Hadamard), block prediction mode, differential pulse-code modulation (DPCM) mode, pattern mode, mid-point prediction (MPP) mode, and/or mid-point predication fall back (MPPF) mode. Several coding modes may be used in the coder to compress different types of content or images. For example, text images may be compressed via pattern mode, while a natural image may be captured via transform mode.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

In a DSC coder according to certain aspects, the rate distortion ("RD") performance of each mode can be evaluated in a variety of color spaces, for example, any luma-chroma representation such as YCoCg or YCbCr, or in an RGB or CMYK color space.

According to certain aspects, the techniques described in the present disclosure can provide various methods to calculate the distortion of the coding modes, for example, where each mode is evaluated in different color spaces. For example, the distortion of all the coding modes may be calculated in the same color space, for instance, by applying an appropriate color transformation. The color transformation may be applied to a residue block, where the residue block represents the difference between the original video blocks and the reconstructed video blocks (also referred to herein as the encoded blocks or error blocks), or the color transformation may be applied to both the original and the reconstructed blocks before calculating the residue.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques. Advanced DSC is being developed, for example, in order to provide compression ratios of 4:1 or higher. Compression ratios of 4:1 or higher may be used for mobile devices, e.g., for high resolution displays such as 4K.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant. This may differ for partial slices, which can occur if the image height is not divisible by the slice height. For example, an image of size 1280×720 with slice height of 108 will have 6 slices of height 108 and one partial slice of height 72 (=720−(6*108)).

Advanced DSC slice dimensions can be specified using variables or parameters slice Width×slice Height, where slice Width and slice Height are configurable. Slice Height can be configured to a desired value, for example, 16, 32, 108, etc. Slice Width can be configured using a parameter N, which determines the number of slices in a line, and it is assumed that the number of pixels per line in each slices is equal, e.g., slice Width=image Width/N. Image Width can be a variable or parameter representing the width of an image.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

As shown in FIG. 1A, video coding system 10 includes a source device 12 that generates source video data 13 and encoded video data 16 to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, video devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via a link 17, the encoded video data 16 to be decoded. The link 17 may comprise any type of medium or device capable of moving the encoded video data 16 from the source device 12 to the destination device 14. In the example of FIG. 1A, the link 17 may comprise a communication medium to enable the source device 12 to transmit encoded video data 16 to the destination device 14 in real-time. The encoded video data 16 may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. The video source 18 may output the captured, pre-captured, or computer generated video as a source video data 13 bitstream to the video encoder 20. However, the techniques described in this disclosure may be applicable to video coding in general, and may be applied to wireless and/or wired applications. For example, the video source 18 may generate and output the source video data 13 over a connection between the video source 18 and the video encoder 20. The connection may include any suitable wired connection (e.g., universal serial bus (USB), FireWire, Thunderbolt, Light Peak, digital video interface (DVI), high-definition multimedia interface (HDMI), video graphics array (VGA), etc.). The connection may also include any suitable wireless connection (e.g., Bluetooth, Wi-Fi, 3G, 4G, LTE, LTE Advanced, 5G, etc.).

The source video data 13 may be received and encoded by the video encoder 20. The encoded video data 16 may be transmitted to the destination device 14 via the output interface 22 of the source device 12. The encoded video data 16 may also (or alternatively) be stored onto a storage device (not shown) for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data 16 over the link 17 and/or from the storage device. The encoded video data 16 communicated over the link 17, or provided on the storage device, may include a variety of syntax elements generated by the video encoder 20 for use by a video decoder, such as the video decoder 30, in decoding the video data 16. Such syntax elements may be included with the encoded video data 16 transmitted on a communication medium, stored on a storage medium, or stored a file server. The video decoder 30 illustrated in FIGS. 1A and 1B may comprise the video decoder 30 illustrated in FIG. 5 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes the source video data 13. The source video data 13 may comprise one or more pictures. Each of the pictures is a still image forming part of a video. In some instances, a picture may be referred to as a video "frame." When the video encoder 20 encodes the source video data 13, the video encoder 20 may generate a bitstream. The bitstream may include a sequence of bits that form a coded representation of the video data 16. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). Quantization may introduce loss into a signal and the amount of loss can be controlled by the QP determined by a rate controller 120. The rate controller 120 is discussed in more detail in FIG. 2. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2:
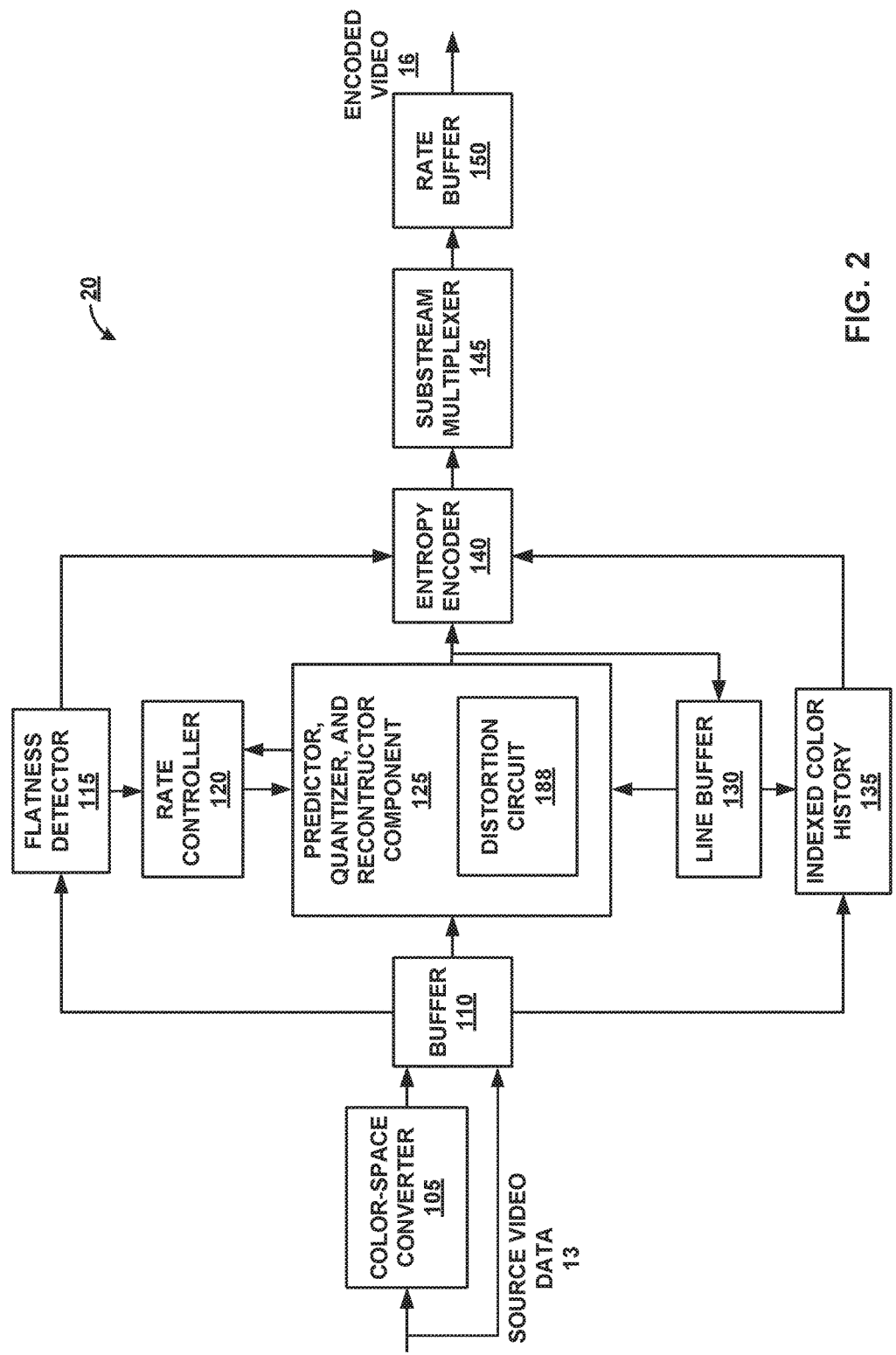
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2, the video encoder 20 includes a plurality of functional components. The functional components of the video encoder 20 include a color-space converter 105, a buffer 110, a flatness detector 115, a rate controller 120, a predictor, quantizer, and reconstructor (PQR) component 125, a distortion circuit 188, a line buffer 130, an indexed color history 135, an entropy encoder 140, a substream multiplexer 145, and a rate buffer 150. In other examples, the video encoder 20 may include more, fewer, or different functional components.

The color-space 105 converter may convert an input color-space of the source video data 13 to the color-space used in a particular coding implementation. For example, the color-space of the source video data 13 may be in the red, green, and blue (RGB) color-space while the coding may be implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed. In some implementations, the video data may bypass the color-space converter 105 in the event that the color space of the input video data is already in the correct format for a particular coding mode. For example, if the input color space is RGB, the video data may bypass the color-space converter 105 for coding by the midpoint prediction mode, which may encode video data in either RGB or luma-chroma representation.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 5 which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. Equation 1 below may be used to calculate the BF:

$$BF=((BufferCurrentSize*100)/BufferMaxSize) \quad (1)$$

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data 16. Specifically, the rate controller 120 and the PQR component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance. The PQR component 125 may select a coding mode for each block from among a plurality of candidate coding modes based on a rate-control technique. The rate-control technique may involve utilizing a buffer model, and a design consideration of the codec may include making sure that the rate buffer 150 is not in a state of underflow (e.g., fewer than zero bits in the buffer) or overflow (e.g., buffer size has increased past a set/defined maximum size). In one embodiment, the rate controller 120 may be designed to select the best coding mode for each block based on the trade-off between rate and distortion, for example, a low cost coding option in terms of the cost $D+\lambda \cdot R$. Here, the parameter R refers to the bitrate of the current block, which may be the total number of bits transmitted between the encoder 20 and the decoder 30 for the current block; the parameter D refers to the distortion of the current block, which may be the difference between the original block and the reconstructed block (or the encoded block). The parameter D may be computed in a number of different ways, for example, as the sum of absolute differences (SAD) (e.g., equations 4, 6, 8, 10, and 12), sum of squared error (e.g., equations 5, 7, 9, 11, and 13), etc. between the original and reconstructed blocks. The parameter λ, or lambda value, is the Lagrangian parameter which may be a trade-off between the parameters R and D. It is noted that the Lagrangian parameter λ may be calculated in various ways, and the selected approach to λ calculation may vary depending on the context and application. For example, Lagrangian parameter λ may be computed based on a number of factors, such as, the rate buffer (150, 155) state (i.e., buffer fullness), first line or non-first line conditions of the block, etc. Even for non-first lines of a slice condition, the spatial prediction mode may be chosen for numerous types of image content.

The PQR component 125 may perform at least three encoding operations of the video encoder 20. The PQR component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the PQR component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. The PQR component 125 may be configured to predict (e.g., encode or decode) the block of video data (or any other unit of prediction) by performing the methods and techniques of the present disclosure.

The PQR component 125 also performs quantization. For example, quantization may be performed via a power-of-2 quantizer which may be implemented using a shifter. It is noted that other quantization techniques may be implemented in lieu of the power-of-2 quantizer. The quantization performed by the PQR component 125 may be based on the QP determined by the rate controller 120. Finally, the PQR component 125 also performs reconstruction which includes adding the inverse quantized residual to the predicted value and ensuring that the result does not fall outside of the valid range of sample values. Herein, the term "residual" may be used interchangeably with "residue."

It is noted that the above-described example approaches to prediction, quantization, and reconstruction performed by the PQR component 125 are merely illustrative and that other approaches may be implemented. It is also noted that the PQR component 125 may include subcomponent(s) for performing the prediction, the quantization, and/or the reconstruction. It is further noted that the prediction, the quantization, and/or the reconstruction may be performed by several separate encoder components in lieu of the PQR component 125.

Still referring to FIG. 2, the PQR component 125 may include the distortion circuit 188. The distortion circuit may correspond to a computing device for executing instructions related to the functions described below. The distortion circuit 188 may include a processor, for example, a video processing unit or a general processing unit, and memory, collectively configured to manage communications and execution of tasks. The distortion circuit 188 may receive an input of video data, the video data being of a variety of color spaces. For example, the color space of the input video data may be an RGB or RCT color space, or a luma-chroma representation such as YCbCr, YCoCg, or the lossless YCoCg-R. The distortion circuit 188 may calculate distortion of a number of coding modes as applied to the input video data. The distortion circuit 188 may determine the optimal coding mode to be used on a specific slice or block of the input video data according to the calculated distortion and a cost function, and provide the PQR component 125 with this information. The cost function controls the rate-distortion performance at the decoder. For example, a coding mode that generates relatively minimal distortion may cause a buffer to overflow if the rate is too high. Alternatively, a relatively high rate may be acceptable, but at the expense of the quality of the image. Hence, the distortion circuit 188 offers the advantage of determining an optimal coding mode for every block or slice of image data received using the rate-control technique, so that image quality and buffer rates are maintained at acceptable levels.

The line buffer 130 holds the output from the PQR component 125 so that the PQR component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the PQR component 125) received from the PQR component 125 based on the indexed color history 135 and the flatness transitions identified by the flatness detector 115. In some examples, the entropy encoder 140 may encode three samples per clock per substream encoder. The substream multiplexer 145 may multiplex the bitstream based on a headerless packet multiplexing scheme. This allows the video decoder 30 to run three entropy decoders in parallel, facilitating the decoding of three pixels per clock. The substream multiplexer 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

Calculation of Distortion

In certain embodiments, the distortion circuit 188 of the video encoder 20 may calculate the distortion of all the coding modes in the same color space. For example, the distortion circuit may calculate the distortion of all the coding modes in the same color space by applying an appropriate color transformation. The appropriate color transformation may refer to the various color transformations disclosed above. Examples of color transformation include, converting an input RGB signal to a luma-chroma representation, and converting a luma-chroma representation to an RGB signal. In one implementation, the distortion circuit 188 may perform color transformation to a set of residue blocks 340a-n, where the residue blocks 340a-n represent the difference between original blocks (310, 315) and reconstructed blocks 330, or encoded blocks. For example, the original blocks (310, 315) may be a partitioned representation of an input frame that has been partitioned into a number of blocks or slices prior to encoding. The reconstructed blocks 330 may represent one of the original blocks in a number of different color spaces, encoded used a plurality of coding modes 325. In another implementation, the distortion circuit 188 may perform color transformation to both the original blocks (310, 315) and the reconstructed blocks 330 before calculating the residue blocks 340a-n.

Figure 3:
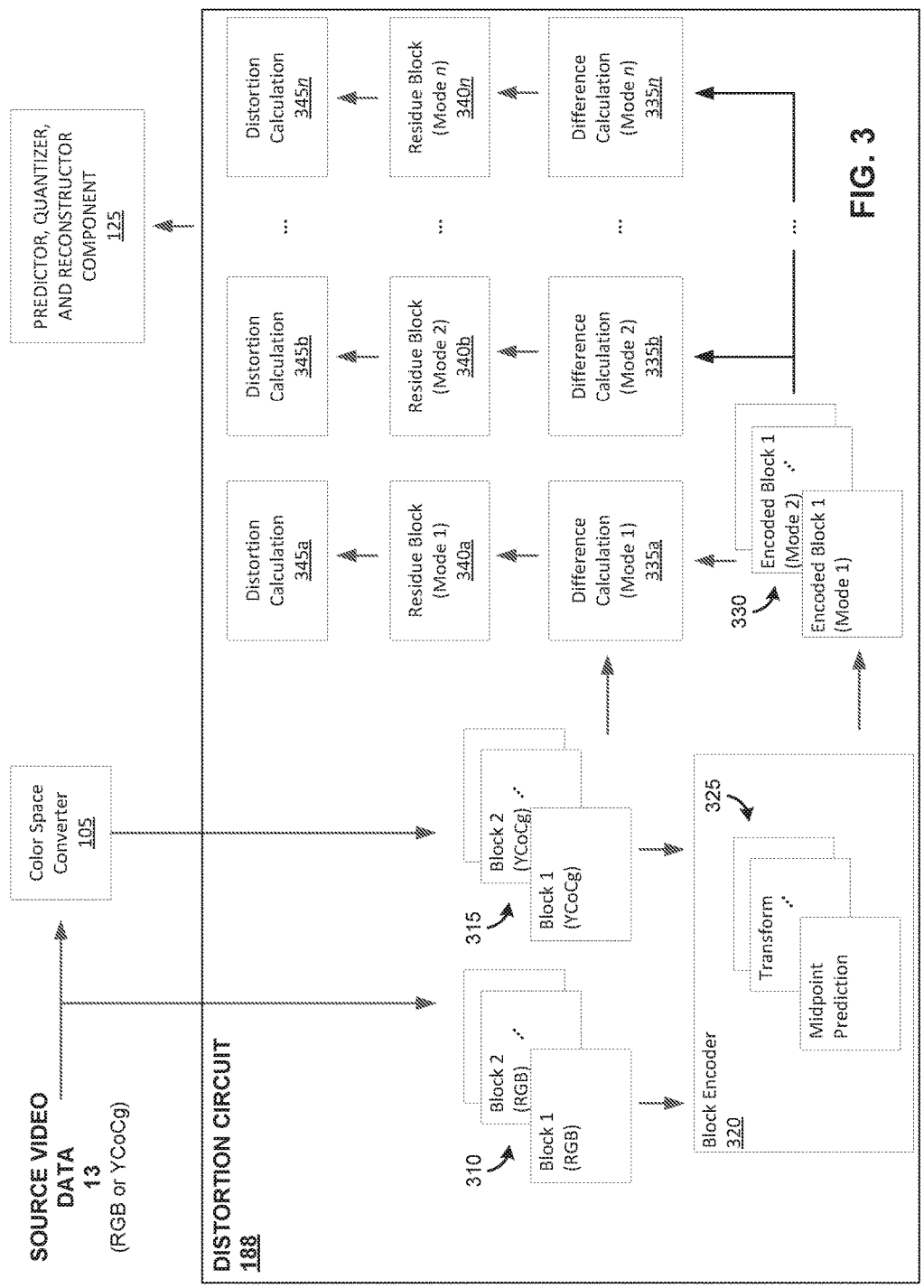
FIG. 3 is a block diagram illustrating an example implementation of a distortion circuit.

FIG. 3 illustrates an example implementation of the distortion circuit 188 of FIG. 2. the distortion circuit includes a plurality of functional components. The functional components of the distortion circuit include a block encoder 320, difference calculation 335a-n components, and distortion calculation 345a-n components. In other examples, the distortion circuit 188 may include more, fewer, or different functional components.

Still referring to FIG. 3, the distortion circuit 188 may receive the source video data 13 from the buffer 110, as well as video data output from the color space converter 105. When the format of the source video data 13 is in the RGB color space, the color space converter 105 may decorrelate the data using a linear color transformation. The color space converter 105 may use various color transformations. For example, transformations that convert RGB to a luma-chroma representations (e.g., YCbCr, YCoCg, or RCT used in JPEG). Also, color transformations that use lossy (YCoCg) and lossless (YCoCg-R) versions of RGB to YCoCg. In one implementation, the color space converter 105 is compatible with a reversible version of the source video data 13 color space (e.g., YCoCg-R), such that the color transformation does not introduce any loss. The reversible transformation can require an additional bit of data for chroma components. For example, for 8 bit RGB, the luma component or channel requires 8 bits, and each of the chroma components (Co and Cg) require 9 bits. A forward color transformation for YCoCg-R may be given as:

$$\begin{bmatrix} Y \\ Co \\ Cg \end{bmatrix} = \begin{bmatrix} 1/4 & 1/2 & 1/4 \\ 1 & 0 & -1 \\ -1/2 & 1 & -1/2 \end{bmatrix} \begin{bmatrix} R \\ G \\ B \end{bmatrix} \quad (2)$$

An inverse color transformation for YCoCg-R may be given as:

$$\begin{bmatrix} R \\ G \\ B \end{bmatrix} = \begin{bmatrix} 1 & 1/2 & -1/2 \\ 1 & 0 & 1/2 \\ 1 & -1/2 & -1/2 \end{bmatrix} \begin{bmatrix} Y \\ Co \\ Cg \end{bmatrix} \quad (3)$$

In the example equations above, the RGB and YCoCg color spaces each include three color planes (i.e., R, G, and B; or Y, Co, and Cg). In the video encoder 20, the rate distortion ("RD") performance of each mode can be evaluated either in YCoCg or in RGB color space. For example, the video encoder 20 may evaluate RD performance in RGB color space using pattern, MPP, and MPP fallback modes while RD performance in the luma-chroma color space may use other modes. The source video data 13 received from the video encoder 20 and the color transformed data received from the color space converter 105 may both be partitioned into blocks or slices. In one embodiment, the source video data 13 may be partitioned at any point prior to receipt by the distortion circuit 188, for example, at the video source 18. In another embodiment, the distortion circuit 188 may partition the source video data 13 to generate the RGB blocks 310 and the YCoCg blocks 315.

Still referring to FIG. 3, the distortion circuit 188 may also include a block encoder 320. The block encoder 320 may include a processor, for example, a video processing unit or a general processing unit, and memory, collectively configured to store instructions and execute tasks. The block encoder 320 may apply a number of coding modes 325 (also referred to herein as "mode 1," "mode 2," or "mode n") to each block on the basis of its color space. For example, coding modes 325 for each block (310, 315) can include transform mode (e.g., DCT, Hadamard), block prediction mode, differential pulse-code modulation (DPCM) mode, pattern mode, mid-point prediction (MPP) mode, and/or mid-point predication fall back (MPPF) mode. The block encoder 320 may receive the RGB blocks 310 and the YCoCg blocks 315 and encode each block with any of the number of coding modes 325. In one embodiment, the block encoder 320 encodes each received block with all of the coding modes that are appropriate for the color space associated with each received block. The block encoder 320 may output a number of reconstructed blocks 330, the reconstructed blocks 330 representing one of the received blocks (310, 315) encoded using the number of modes. For example, Block 1 of the RGB blocks 310 may be encoded using the midpoint prediction mode and the transform mode from the coding modes 325. The block encoder 320 may output two blocks corresponding to Block 1, each encoded by either midpoint prediction mode or transform mode, each encoded block being an encoded representation of Block 1 of the RGB blocks 310. The block encoder 320 generates the number of reconstructed blocks 330 so that the distortion circuit 188 can calculate the difference between both the RGB blocks 310 and the YCoCg blocks 315 as received, and the reconstructed blocks 330 for each mode.

Still referring to FIG. 3, the distortion circuit 188 may further include difference calculation 335a-n components. The difference calculation 335a-n components may include a processor, for example, a video processing unit or a general processing unit, and memory, collectively configured to store instructions and execute tasks. The difference calculation 335a-n components may calculate a difference between the reconstructed blocks 330 and their corresponding original blocks (310, 315). For example, the block encoder 320 may encode Block 1 of the RGB blocks 310 using the midpoint prediction mode and the transform mode from the coding modes 325. The block encoder 320 may output two blocks corresponding to Block 1, each encoded by either midpoint prediction mode or transform mode, each encoded block being an encoded representation of Block 1 of the RGB blocks 310. The difference calculation 335a module may calculate the difference between Block 1 of the RGB blocks 310 and the corresponding encoded block mode 1 (i.e., encoded by the midpoint prediction mode) of the reconstructed blocks 330. The difference calculation 335b module may calculate the difference between Block 1 of the RGB blocks 310 and the corresponding encoded block mode 2 (i.e., encoded by the transform mode) of the reconstructed blocks 330. The difference calculation 335a-n may generate the residue blocks 340a-n, where the residue blocks 340a-n represent the difference between the RGB blocks 310 and the YCoCg blocks 315, and their corresponding reconstructed blocks 330.

Still referring to FIG. 3, the distortion circuit 188 may perform a distortion calculation 345a-n. The distortion calculation 345a-n may calculate the distortion of each residue block 340a-n. The distortion calculation 345a-n may include a color space transformation function that converts the received residue blocks 340a-n to a uniform color space before calculating the distortion of the residue blocks 340*a-n*. The distortion circuit 188 may determine the best mode for a particular block based on the calculated distortion, and output the block encoded with the best mode to the PQR component 125. For example, if the source video data 13 being input into the distortion circuit 188 is in the RGB color space, then the block encoder 320 may encode Block 1 of the RGB color space 310 using both midpoint prediction mode, thereby generating one encoded version of Block 1 of the RGB color space. However, certain coding modes of the plurality of coding modes 325 can only encode video blocks in the luma-chroma color space. Therefore, the color space converter 105 may convert the color space of the source video data 13 from the RGB color space to the luma-chroma representation such as YCoCg. Block encoder 320 may encode Block 1 of the YCoCg color space 315 with both transform mode and pattern mode, thereby generating two encoded versions of Block 1 of the YCoCg color space. The difference calculation 335*a-n* may generate residue blocks 340*a-n* for Block 1 in each mode. The distortion calculation 345*a-n* may perform the color space transformation function on either of the residue blocks 340*a-n* in the RGB color space or the residue blocks 340*a-n* in the YCoCg color space, so that the distortion of each mode used on Block 1 can be calculated in the same color space.

In one example, for all the modes, the distortion circuit 188 may perform a distortion calculation 345*a-n* in either the RGB color space or in the luma-chroma color space, where the distortion calculation includes SAD (sum of absolute differences) or SSE (sum of square error). For example, when the YCoCg-R transform is used as the color space to calculate the distortion, the distortion of the chroma components may be normalized to account for the one additional bit. For example, YCoCg-R may use 8 bit per luma component and 9 bits for each of the chroma components. SAD in YCoCg color space may be calculated as follows in equation 4:

$$SAD_{YCoCg} = SAD(Y) + (SAD(Co) + SAD(Cg) + \text{offset}) >> 1 \quad (4)$$

where:
SAD(Y): sum of absolute differences for the luma components of a block,
SAD(Co): sum of absolute differences for the Co chroma components of the block,
SAD(Cg): sum of absolute differences for the Cg chroma components of the block, and
offset: an optional value that may be used to round to the nearest integer, for example, the offset may be a value 0 or 1.

Note that the luma component (Y) or luma plane, and the chroma components (Co, Cg) or chroma planes, represent the luma and chroma values for every pixel in the block or slice being analyzed. For example, applying equation 4 to a block containing 16 pixels will result in a calculation of the SAD for each of 16 samples of luma values, 16 samples of Co values, and 16 samples of Cg values. The resulting $SAD_{YCoCg}$ value is shifted right by 1 to effectively normalize the chroma components to account for the one extra bit in each component.

When SSE is used as the metric to calculate the distortion, equation 5 may be used:

$$SSE_{YCoCg} = SSE(Y) + (SSE(Co) + SSE(Cg) + \text{offset}) >> 1 \quad (5)$$

where:
SSE(Y): sum of squared error for the luma components of a block,
SSE(Co): sum of squared error for the Co chroma components of the block,
SSE(Cg): sum of squared error for the Cg chroma components of the block, and
offset: an optional value that may be used to round to the nearest integer, for example, the offset may be a value 0 or 1.

Note that the luma component (Y) or luma plane, and the chroma components (Co, Cg) or chroma planes, represent the luma and chroma values for every pixel in the block or slice being analyzed. For example, applying equation 5 to a block containing 16 pixels will result in a calculation of the SSE for each of 16 samples of luma values, 16 samples of Co values, and 16 samples of Cg values. The resulting $SSE_{YCoCg}$ value is shifted right by 1 to effectively normalize the chroma components to account for the one extra bit in each component.

Alternatively, the distortion circuit 188 may apply weighting to each color plane in the YCoCg color space to effectively consider the human contrast visual sensitivity. As human vision can be more sensitive to luminance than chrominance, the distortion circuit 188 may apply a larger weight to the luma component and smaller weights to the chroma components, relative to the luma component. For example, the calculation of SAD is as follows:

$$SAD_{YCoCg} = W_Y * SAD(Y) W_{Co}(SAD_{Co} + \text{offset}) >> 1) + W_{Cg} * ((SAD_{Cg} + \text{offset}) >> 1 \quad (6)$$

where $W_Y$, $W_{Co}$ and $W_{Cg}$ are the weights applied to the respective luma and chroma components. Similar visual weights can be used when SSE is used as the distortion metric:

$$SSE_{YCoCg} = W_Y * SSE(Y) + W_{Co}((SSE_{Co} + \text{offset}) >> 1) + W_{Cg} * ((SSE_{Cg} + \text{offset}) >> 1 \quad (7)$$

For example, instead of applying a color transformation to the residue block 340*a-n* in the distortion calculations 345*a-n*, the distortion circuit 188 may derive weights from a color transformation matrix of equation 2 and 3, and the distortion in each luma and chroma component can be weighted to calculate the distortion. This method avoids the computations for color transformation performed in the distortion calculation 345*a-n*, thereby simplifying the process. The distortion circuit 188 may calculate weights for each component based on a column norm (e.g., $l_2$ norm (Euclidean norm)) of each of the three columns of values in the transformation matrix. For example, when distortion of the coding modes are calculated in the RGB color space, the distortion of the coding modes operating in the YCoCg color space are calculated using the transformation matrix of equation 3 as follows in either of equation 8 and 9:

$$SAD_{YCoCg} = \sqrt{3}\, SAD_Y + \sqrt{\frac{1}{2}}\, SAD_{Co} + \sqrt{\frac{3}{4}}\, SAD_{Cg} \quad (8)$$

Here, the weights $$\left(\sqrt{3}, \sqrt{\frac{1}{2}}, \sqrt{\frac{3}{4}}\right)$$

represent the $l_2$ norm of the columns in the inverse transformation matrix (YCoCg to RGB).

$$SSE_{YCoCg} = 3 SSE_Y + 0.5 SSE_{Co} + 0.75 SSE_{Cg} \quad (9)$$

Here, the weights (3, 0.5, 0.75) represent the square of the $l_2$ norm of the respective columns in the inverse transformation matrix (YCoCg to RGB). Furthermore, instead of using floating point calculations, fixed point calculations may be used to calculate the distortion. For example, weights $$\left(\sqrt{3}, \sqrt{\frac{3}{4}}, \sqrt{\frac{3}{4}}\right)$$

can be represented with 8 bit fractional precision as $$\left(\frac{443}{256}, \frac{181}{256}, \frac{222}{256}\right).$$

Alternatively, when YCoCg color space is set as the color space for calculating the distortion, the weights can be derived based on columns of the forward transformation matrix in order to weigh the R, G and B distortion. For example, SAD may be calculated as:

$$SAD_{RGB} = W_R * SAD(R) W_G * SAD(G) W_B * SAD(B) \quad (10)$$

where $W_R$, $W_G$ and $W_B$ are the weights applied to the respective luma and chroma components. Similar visual weights can be used when SSE is used as the distortion metric:

$$SSE_{RGB} = W_R * SSE(R) W_G * SSE(G) W_B * SSE(B) \quad (11)$$

Note that the R component (R), the G component (G), and the B component (B) represent the red, green, and blue values for every pixel in the block or slice being analyzed. For example, applying equation 10 and 11 to a block containing 16 pixels will result in a calculation of the SAD and the SSE for each of 16 samples of red values, 16 samples of green values, and 16 samples of blue values. Weights for each component may be calculated based on a column norm (e.g., $l_2$ norm (Euclidean norm)) of each of the three columns of values in the forward transformation matrix. For example, when distortion of the coding modes are calculated in the YCoCg color space, the distortion of the coding modes operating in the RGB color space may be calculated using the forward transformation matrix of equation 2 as follows in either of equation 12 and 13:

$$SAD_{RGB} = \sqrt{\frac{11}{8}} SAD_R + \sqrt{\frac{5}{4}} SAD_G + \sqrt{\frac{11}{8}} SAD_B \quad (12)$$

Here, the weights $$\left(\sqrt{\frac{11}{8}}, \sqrt{\frac{5}{4}}, \sqrt{\frac{11}{8}}\right)$$

represent the $l_2$ norm of the columns in the forward transformation matrix (RGB to YCoCg).

$$SSE_{RGB} = \frac{11}{8} SSE_R + \frac{5}{4} SSE_G + \frac{11}{8} SSE_B \quad (13)$$

Here, the weights (11/4, 5/4, 11/8) represent the square of the $l_2$ norm of the respective columns in the inverse transformation matrix (RGB to YCoCg). Furthermore, instead of using floating point calculations, fixed point calculations may be used to calculate the distortion.

The techniques and methods described above are not only limited to RGB to YCoCg lossless color transformation, and they can be applied to any linear color transformation, e.g., YCbCr, YCoCg lossy transformation. In this manner, the techniques can use the same color space in order to calculate the distortion for various coding modes (e.g., all coding modes). Using the same color space can make calculation more efficient and improve performance. The examples and embodiments described in this disclosure may be implemented separately or in combination, depending on the embodiment. Certain features of the examples and the embodiments may be omitted or changed, and other features may be added to the examples and the embodiments, depending on the embodiment.

Figure 4:
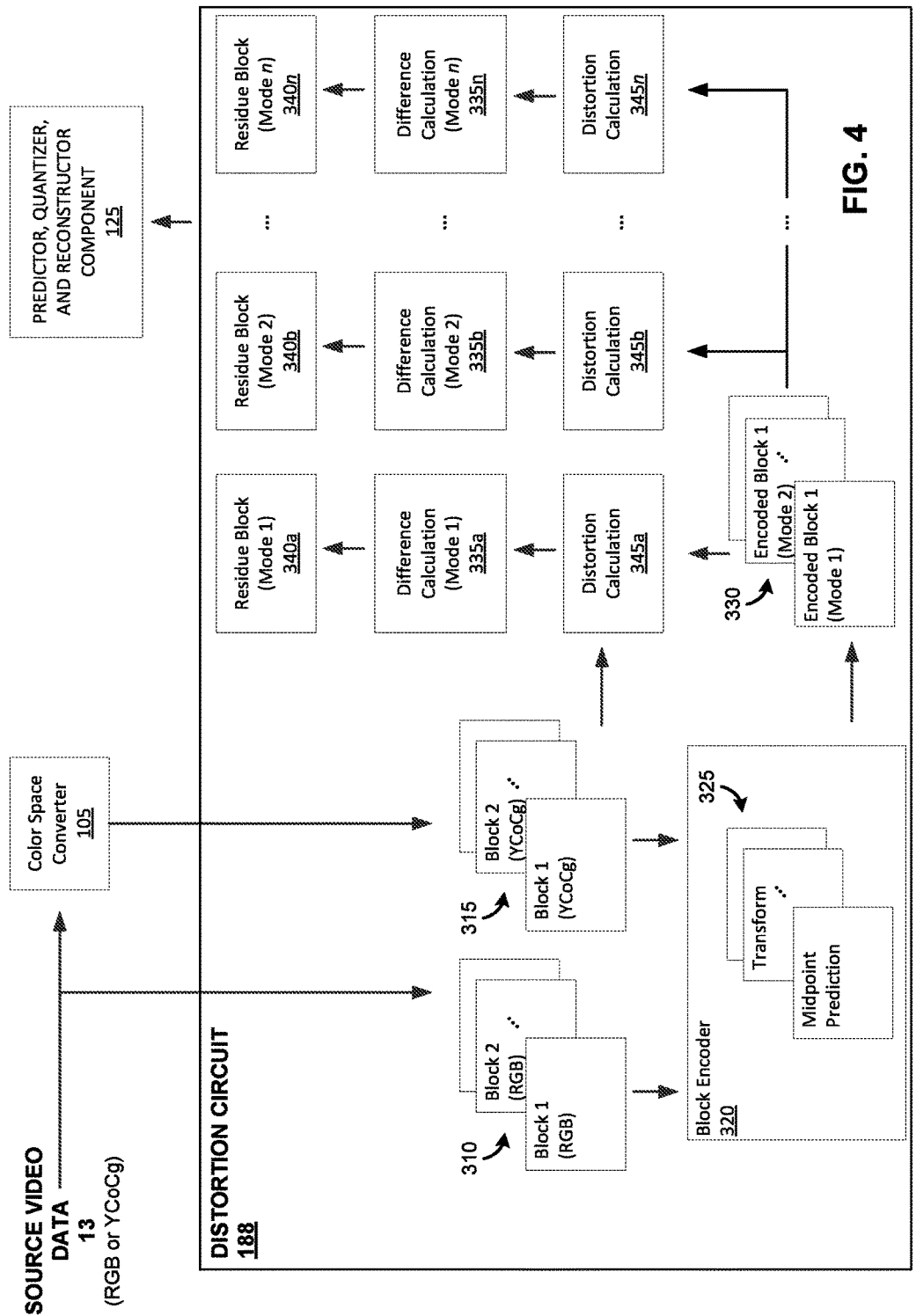
FIG. 4 is a block diagram illustrating an alternative implementation of the distortion circuit.

FIG. 4 illustrates an alternative embodiment of the distortion circuit 188 substantially similar to FIG. 3. In this embodiment, the color transformation and distortion calculation 345a-n may be applied to both the original and the reconstructed blocks before the difference calculation 335a-n and generation of the residue blocks 340a-n. All other functional blocks of the distortion circuit 188 in FIG. 3 function in a similar manner to the functional blocks of distortion circuit 188 of FIG. 4. Note that although FIG. 4 illustrates the difference calculations 335a-n being made based on the distortion calculations 345a-n, an alternative embodiment may include a difference calculation made in a manner similar to FIG. 3.

DSC Video Decoder

Figure 5:
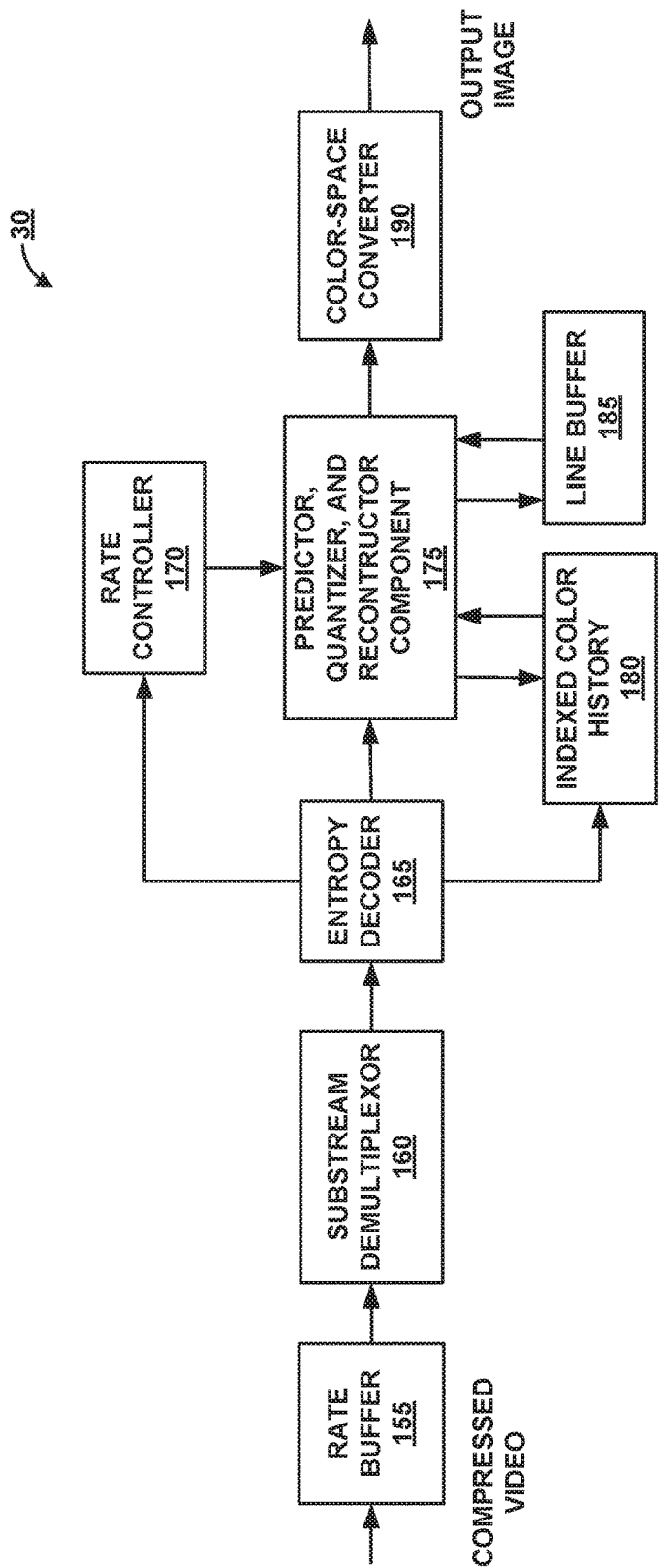
FIG. 5 is a block diagram illustrating an example of a video decoder that may implement techniques in accordance with aspects described in this disclosure.

FIG. 5 is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 5, the video decoder 30 includes a plurality of functional components. The functional components of the video decoder 30 include a rate buffer 155, a substream demultiplexer 160, an entropy decoder 165, a rate controller 170, a predictor, quantizer, and reconstructor (PQR) component 175, an indexed color history 180, a line buffer 185, and a color-space converter 190. The illustrated components of the video decoder 30 are analogous to the corresponding components described above in connection with the video encoder 20 in FIG. 2. As such, each of the components of the video decoder 30 may operate in a similar fashion to the corresponding components of the video encoder 20 as described above.

Still referring to FIG. 5, the rate buffer 155 of the video decoder 30 may be a portion of the physical memory used to store compressed video data received from the input interface 28 of FIG. 1B. The rate buffer 155 may receive the compressed video data at a bit rate, and output the compressed video stream at a constant bit rate. To ensure proper decoding, the rate buffer 155 of the video decoder 30 should not "underflow" or "overflow" during the decoding of the compressed bit stream. In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time, as noted in Equation 1 above. The rate buffer 155 can smooth the rate variations in the compressed video. The rate buffer 155 may function as part of the rate control mechanism in the video decoder 30, which will be described in greater detail below in connection with the rate controller 170.

The BF may be calculated in other ways, and the selected approach to BF calculation may vary depending on the context and application. In another example, the BF may be normalized from 0 to 1, by dividing BF by 100. The normalized BF value may be used to calculate the λ value. The λ value based on buffer fullness can be calculated based on the following equation:

$$\lambda(x) = \text{Max}\left(\Lambda, a_1 \cdot 2^{\frac{((x \cdot b_1)-c_1)}{d_1}}\right) \quad (14)$$

where $\{\Lambda, a_1, b_1, c_1, d_1\}$ are tunable parameters. $x \in [0,1]$ and x are calculated as $$x = \frac{BF}{100},$$

where BF is represented here as a percentage (e.g., percentage of bits occupied in the buffer).

Still referring to FIG. 5, the substream demultiplexer 160 may include an integrated circuit device that receives the compressed video data from the rate buffer 155 and outputs the data using a number of output lines connected to the entropy decoder 165, the output line determined by a selection input. The substream demultiplexer 160 may be arranged to divide the received compressed video data into one or more demux bitstreams for transmission over one or more channels. The one or more bitstreams may be output to one or more entropy decoders 165 for decoding. The substream demultiplexer 160 may be used as a complementary device for demultiplexing the multiplexed data output from the substream multiplexer 145 of the video encoder 20.

Still referring to FIG. 5, the entropy decoder 165 may include an electronic circuit, for example, a video processing unit, or a general processing unit. The entropy decoder 165 may receive the compressed video data from the substream demultiplexer 160. Entropy decoding unit 165 may parse the compressed video data to obtain syntax elements from the bitstream. Entropy decoding unit 165 may entropy decode entropy-encoded syntax elements. The received compressed video data may include coded slice data. As part of decoding the bitstream, entropy decoding unit 165 may extract and entropy decode syntax elements from the coded slice data. Each of the coded slices may include a slice header and slice data. The slice header may contain syntax elements pertaining to a slice. The entropy decoder 165 may forward motion vectors and other syntax elements to the PQR component 175. Video decoder 30 may receive the syntax elements at the video slice level and/or the video block level. The entropy decoder 165 may be used as a complementary device for decoding the data encoded by the entropy encoder 140 of the video encoder 20. The PQR component 175 may generate decoded video data based on the syntax elements extracted from the bitstream.

Still referring to FIG. 5, the rate controller 170 may include an electronic circuit, for example, a video processing unit, or a general processing unit. The rate controller 170 may receive an entropy decoded bitstream as an input from the entropy decoder 165. The rate controller 170 determines a set of coding parameters, e.g., a QP. The QP may be adjusted by the rate controller 170 based on the buffer fullness of the rate buffer 155 and image activity of the video data in order to maximize picture quality for a target bitrate which ensures that the rate buffer 155 does not overflow or underflow. The rate controller 170 also selects a particular coding option (e.g., a particular mode) for each block of the video data in order to achieve the optimal rate-distortion performance. The rate controller 170 minimizes the distortion of the reconstructed images such that it satisfies the bit-rate constraint, i.e., the overall actual coding rate fits within the target bit rate. In other words, the rate controller prevents a buffer failure by preventing the block rate from overwhelming available resources.

Still referring to FIG. 5, the indexed color history 180 may include an electronic circuit, for example, a video processing unit, or a general processing unit, either of which includes a memory. The indexed color history 180 may receive a bitstream of compressed video from one or more entropy decoders 165, and may also receive data from the PQR component 175. The indexed color history 180 may store recently used pixel values. These recently used pixel values can be referenced directly by the PQR component 175 via a dedicated syntax. An advantage of using the indexed color history 180 includes managing the colors of a digital image to speed up display refresh and data transfer.

Still referring to FIG. 5, the line buffer 185 may include an electronic circuit, for example, a storage device implemented on an integrated circuit. The line buffer 185 holds the output from the PQR component 175 so that the PQR component 175 and the indexed color history 180 can use the buffered video data. The indexed color history 180 stores recently used pixel values. These recently used pixel values can be referenced directly by the video decoder 30 via a dedicated syntax.

Still referring to FIG. 5, the PQR component 175 may include an electronic circuit, for example, a video processing unit, or a general processing unit. The PQR component 175 may perform at least three encoding operations of the video decoder 30. For example, the PQR component 175 may perform prediction in a number of different modes. For example, if a video slice is coded as an intra-coded slice, the PQR component 175 may generate prediction data for a video block of the current video slice based on a signaled intra-prediction mode and data from previously decoded blocks of the current frame or picture. In another example, if the video frame is coded as an inter-coded slice, the PQR component 175 may produce predictive blocks for a video block of the current video slice based on motion vectors and other syntax elements received from the entropy decoder 165. Prediction processing may provide the resulting intra- or inter-coded block to a summer or a reconstructor to generate residual block data and to reconstruct a decoded block.

The PQR component 175 also performs quantization. Residual blocks may be determined via inverse quantization. For example, inverse quantization processing quantizes (i.e., de-quantizes), the quantized transform coefficients provided in the bitstream and decoded by entropy decoder 165. The inverse quantization process may include use of a quantization parameter calculated by video encoder 20 for each video block in the video slice to determine a degree of quantization and, likewise, a degree of inverse quantization that should be applied. The PQR component 175 may include an inverse transform process that applies an inverse transform (e.g., an inverse DCT, an inverse integer transform, or a conceptually similar inverse transform process), to the transform coefficients in order to produce residual blocks in the pixel domain. The PQR component 175 may be used as a complementary device for inverse quantization of data output from the PQR component 125 of the video encoder 20.

The PQR component 175 also performs reconstruction. The PQR component 175 may reconstruct the residual block in the pixel domain for later use as a reference block. For example, in a luma-chroma representation, the reconstructor may use the residual values from the luma, Cb, and Cr transform blocks associated with transform units (TUs) of a coding unit (CU) and the prediction unit (PU) luma, Cb, and Cr blocks of the PUs of the CU, i.e., either intra-prediction data or inter-prediction data, as applicable, to reconstruct the luma, Cb, and Cr coding blocks of the CU. For example, the reconstructor of the PQR component 175 may add samples of the luma, Cb, and Cr transform blocks to corresponding samples of the predictive luma, Cb, and Cr blocks to reconstruct the luma, Cb, and Cr coding blocks of the CU.

Referring again to FIG. 5, the color-space converter 190 may include an electronic circuit, for example, a video processing unit, or a general processing unit. The color-space converter 190 may convert a color-space used in the coding implementation to a color-space used in a display implementation. For example, the color-space received by the color-space converter 190 may be in the luminance Y, chrominance green Cg, and chrominance orange Co (YCgCo) color-space used by the coding implementation, and the display implementation may include a red, green, and blue (RGB) color-space. The color-space conversion may be performed by method(s) including shifts and additions to the video data noted in Equations 2 and 3 above. It is noted that input video data in other color-spaces may be processed and conversions to other color-spaces may also be performed.

In related aspects, the video decoder 30 may include the rate buffer 155 and/or the line buffer 185. For example, the rate buffer 155 may hold the color-space converted video data prior to its use by other portions of the video decoder 30. In another example, the video data may be stored in the luma-chroma color-space and color-space conversion may be performed as needed, since the color-space converted data may require more bits.

Figure 6:
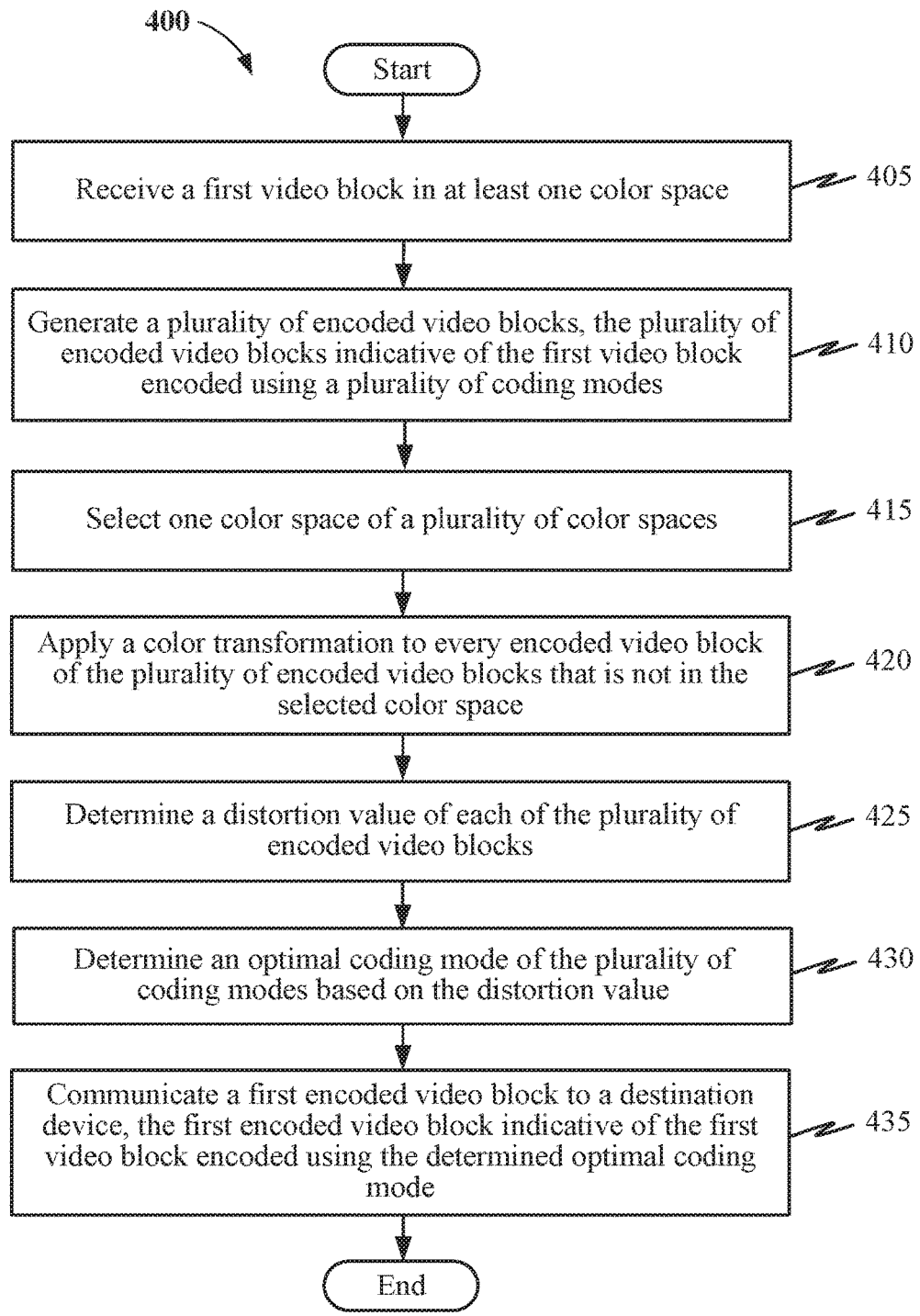
FIG. 6 is a flow diagram illustrating an exemplary method for determining an encoding mode.

FIG. 6 is a flowchart that illustrates an example of a process 400 for determining the coding mode for a first video block (310, 315). At block 405, the distortion circuit 188 of the video encoder 20 receives the first video block (310, 315) in at least one color space. In some implementations, the first video block (310, 315) may be received in the number of different color spaces. For example, the first video block (310, 315) may be received in the RGB color space and the luma-chroma color space.

Still referring to FIG. 6, at block 410, the block encoder 320 of the distortion circuit 188 generates a plurality of reconstructed video blocks 330. The plurality of reconstructed video blocks 330 are indicative of the first video block (310, 315), encoded using the plurality of coding modes 325. In other words, each of the plurality of reconstructed video blocks 330 is a copy of the first video block (310, 315) that has been reconstructed using one of the number of coding modes. In some implementations, the block encoder 320 may encode the first video block (310, 315) using the number of coding modes that are compatible with the color space of the first video block (310, 315). For example, the block encoder 320 may encode the first video block of the RGB color space 310 using the midpoint prediction mode. The block encoder 320 may also encode the first video block of the YCoCg color space 315 using the transform mode. In this example, the block encoder 320 generates the plurality of reconstructed video blocks 330, where the plurality of reconstructed video blocks 330 are represented in different color spaces and are indicative of the first video block (310, 315).

Still referring to FIG. 6, at block 415, the distortion circuit 188 selects one color space of the plurality of color spaces. In one implementation, the distortion circuit 188 may determine, of the plurality of reconstructed video blocks 330, a number of reconstructed blocks in the RGB color space and a number of reconstructed blocks in a luma-chroma representation. The distortion circuit 188 may reduce the calculations at block 420 by selecting the color space that represents the majority of the reconstructed video blocks 330. In another implementation, a user may select the color space, or the distortion circuit 188 may be pre-programmed to select a specific color space.

Still referring to FIG. 6, at block 420, the distortion circuit 188 applies the color transformation to every encoded video block of the plurality of reconstructed video blocks 330 that is not in the selected color space. The color transformation may include the color transformation matrices of equations 2 and 3, where the color transformation matrices includes a number of columns equal to a number of color planes in the color space. In one implementation, the distortion circuit 188 applies the color transformation to a number of residue blocks 340*a-n*, where each residue block represents the difference between the first video block (310, 315) and each of the plurality of reconstructed video blocks 330. In another implementation, the distortion circuit 188 applies the color transformation to both the first video block (310, 315) and each of the plurality of reconstructed video blocks 330 before calculating the residue blocks 340*a-n*.

Still referring to FIG. 6, at block 425, the distortion circuit 188 determines a distortion value of each of the plurality of residue blocks 340*a-n*. In another implementation, the distortion circuit 188 determines the distortion value of each of the plurality of reconstructed video blocks 330. In either implementation, the distortion circuit 188 may calculate the distortion value in either the RGB color space or in the luma-chroma color space, where the distortion value may be the SAD or the SSE of either (i) each of the reconstructed blocks 330, or (ii) each of the residue blocks 340*a-n*. In another implementation, when the selected color space is a luma-chroma colorspace, the distortion circuit 188 may normalize the calculated distortion value to account for the extra bits in the chroma components. For example, the distortion circuit 188 may shift the distortion value calculated by the SAD or the SEE to the right by 1. In yet another implementation, the distortion circuit 188 may apply weighting values the SAD and SSE calculations in the luma-chroma color space. For example, the distortion circuit 188 may calculate weights for each color plane in the luma-chroma color space based on a column norm, or a Euclidean norm, of each column in the color transformation matrix.

Still referring to FIG. 6, at block 430, the distortion circuit 188 determines an optimal coding mode of the plurality of coding modes 325 based on a cost function which considers both a bitrate the distortion value. In one implementation, the distortion circuit 188 determines the coding mode using a cost-value function. For example, the distortion circuit 188 may determine the optimal coding mode based on a trade-off between bitrate and distortion in terms of the cost function: $D+\lambda*R$. Here, the parameter R refers to a bitrate of the first video block (310, 315), which may be the total number of bits transmitted between the encoder 20 and a decoder 30 for the first video block (310, 315). The parameter D refers to the distortion of the first video block (310, 315). The parameter $\lambda$ is the Lagrangian parameter which may be a trade-off between the parameters R and D. It is noted that the Lagrangian parameter $\lambda$ may be calculated in various ways, and the selected approach to $\lambda$ calculation may vary depending on the context and application. For example, the video encoder may compute the Lagrangian parameter $\lambda$ based on a number of factors, such as, a rate buffer (150, 155) state, conditions of the first video block (310, 315), etc.

Still referring to FIG. 6, at block 435, the video encoder 20 communicates a first encoded video block to a destination device, the first encoded video block indicative of the first video block (310, 315) encoded using the determined optimal coding mode.

Other Considerations

It should be noted that aspects of this disclosure have been described from the perspective of an encoder, such as the video encoder 20 in FIG. 2. However, those skilled in the art will appreciate that the reverse operations to those described above may be applied to decode the generated bitstream by, for example, the video decoder 30 in FIG. 5.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. An apparatus for coding video data, comprising:
  a memory for storing the video data and information about a plurality of coding modes, the video data comprising a plurality of video blocks; and
  a hardware processor operationally coupled to the memory and configured to:

select one of a plurality of color spaces for a video block of the plurality of video blocks,
apply a color transformation to every video block of the plurality of video blocks that is not in the selected color space and verify that all of the video blocks of the plurality of video blocks are in the selected color space,
determine a distortion value of each of the plurality of video blocks based on the selected color space,
determine a respective coding mode from the plurality of coding modes based on the respective distortion value for each of the plurality of video blocks, and
encode the plurality of video blocks using the determined respective coding modes.

2. The apparatus of claim 1, wherein the hardware processor is further configured to:
determine an initial color space of each video block of the plurality of video blocks, the initial color space being the color space of each video block prior to application of the color transformation;
determine which coding modes of the plurality of coding modes are used with the initial color space; and
encode the video block of the plurality of video blocks with the coding modes to provide an encoded block.

3. The apparatus of claim 1, wherein the hardware processor is further configured to:
determine which coding modes of the plurality of coding modes are not used with an initial color space, the initial color space being the color space of each video block prior to application of the color transformation;
apply the color transformation to the initial color space to provide a compatible color block; and
encode the compatible color block with the coding modes not used with the initial color space to provide an encoded block.

4. The apparatus of claim 2, wherein the hardware processor is further configured to calculate a residue block from the video block and the encoded block, the residue block indicative of a difference between the video block and the encoded block.

5. The apparatus of claim 4, wherein determining the distortion value comprises determining the distortion value of the residue block.

6. The apparatus of claim 1, wherein the selected color space comprises a luma-chroma color space and wherein determining the distortion value comprises normalizing each chroma component of the luma-chroma color space.

7. The apparatus of claim 1, wherein the video block comprises a number of color planes, and wherein determining the distortion value of the video block comprises at least one of:
a sum of absolute differences of each color plane of the number of color planes, and
a sum of square error of each color plane of the number of color planes.

8. The apparatus of claim 1, wherein the color transformation is based on a transformation matrix, the transformation matrix is defined by a number of columns indicative of a number of color planes of the selected color space, and wherein the hardware processor is further configured to determine a weight value based on a Euclidean norm of a column of the number of columns.

9. The apparatus of claim 8, wherein the distortion value of the transformed video block is based on at least one of:
a sum of absolute differences of each color plane of the number of color planes, wherein each color plane is multiplied by a corresponding weight value of the number of weight values, and
a sum of square error of each color plane of the number of color planes, wherein each color plane is multiplied by the corresponding weight of the number of weights.

10. The apparatus of claim 1, wherein the selected color space is in at least one of a luma-chroma color space and an RGB color space.

11. The apparatus of claim 1, wherein determining the respective coding modes further comprises determining the respective coding modes based on (i) the distortion value of each of the plurality of video blocks, (ii) a lambda value, and (iii) a bitstream rate for communicating the video block.

12. The apparatus of claim 1, wherein each video block of the plurality of video blocks is indicative of a single video block that has been encoded using every coding mode of the plurality of coding modes.

13. A method of coding video data, comprising:
selecting one of a plurality of color spaces for a video block of a plurality of video blocks;
applying a color transformation to every video block of the plurality of video blocks that is not in the selected color space and verify that all of the video blocks of the plurality of video blocks are in the selected color space;
determining a distortion value of each of the plurality of video blocks based on the selected color space;
determining a respective coding mode from the plurality of coding modes based on the respective distortion value for each of the plurality of video blocks; and
encoding the plurality of video blocks using the determined respective coding modes.

14. The method of claim 13, further comprising:
determining an initial color space of each video block of the plurality of video blocks, the initial color space being the color space of each video block prior to application of the color transformation;
determining which coding modes of a plurality of coding modes are used with the initial color space; and
encoding the video block of the plurality of video blocks with coding modes to provide an encoded block.

15. The method of claim 13, further comprising:
determining which coding modes of a plurality of coding modes are not used with an initial color space, the initial color space being the color space of each video block prior to application of the color transformation;
applying the color transformation to the initial color space to provide a compatible color block; and
encoding the compatible color block with coding modes not used with the initial color space to provide an encoded block.

16. The method of claim 14, further comprising calculating a residue block from the video block and the encoded block, the residue block indicative of a difference between the video block and the encoded block.

17. The method of claim 13, wherein determining the respective coding modes further comprises determining the respective coding modes based on (i) the distortion value of each of the plurality of video blocks, (ii) a lambda value, and (iii) a bitstream rate for communicating the video block.

18. A non-transitory computer-readable medium comprising instructions that, when executed by a device, cause the device to:
select one of a plurality of color spaces for a video block of the plurality of video blocks,
apply a color transformation to every video block of the plurality of video blocks that is not in the selected color space and verify that all of the video blocks of the plurality of video blocks are in the selected color space, and determine a distortion value of each of the plurality of video blocks based on the selected color space, determine a respective coding mode from the plurality of coding modes based on the respective distortion value for each of the plurality of video blocks, and encode the plurality of video blocks using the determined respective coding modes.

19. The non-transitory computer-readable medium of claim 18, further comprising:

determine an initial color space of each video block of the plurality of video blocks, the initial color space being the color space of each video block prior to application of the color transformation;

determine which coding modes of a plurality of coding modes are used with the initial color space; and encode the video block of the plurality of video blocks with coding modes to provide an encoded block.

20. The non-transitory computer-readable medium of claim 18, further comprising:

determine which coding modes of a plurality of coding modes are not used with an initial color space, the initial color space being the color space of each video block prior to application of the color transformation;

apply the color transformation to the initial color space to provide a compatible color block; and encode the compatible color block with coding modes not used with the initial color space to provide an encoded block.

* * * * *